United States Patent [19]

Manning

[11] 4,449,049

[45] May 15, 1984

[54] PORTABLE BATTERY-FREE CHARGER FOR RADIATION DOSIMETERS

[75] Inventor: Frank W. Manning, Norris, Tenn.

[73] Assignee: The United States of America as represented by the United States Department of Energy, Washington, D.C.

[21] Appl. No.: 343,607

[22] Filed: Jan. 28, 1982

[51] Int. Cl.³ .............................................. G01T 1/18
[52] U.S. Cl. ................................................. 250/377
[58] Field of Search ............. 250/376, 378, 377, 472.1

[56] References Cited

U.S. PATENT DOCUMENTS

| | | |
|---|---|---|
| 2,761,073 | 8/1956 | Carlbom et al. |
| 2,871,365 | 1/1959 | Cahen et al. ........................ 250/377 |
| 2,884,533 | 4/1959 | Richard-Foy ....................... 250/377 |
| 3,193,749 | 7/1965 | Grimm et al. ....................... 250/377 |
| 4,247,775 | 1/1981 | Kronenberg ........................ 250/377 |

OTHER PUBLICATIONS

*Repair & Maintenance Manual of Civil Defense Radiological Instruments*, vol. 4, "Dosimeters & Chargers", Office of Civil Defense, Washington, D.C., pp. 19.1–19.11 and pp. 23.16 and 23.17.
"Health Physics Instrument Manual", Oak Ridge National Laboratory, ORNL Report 332, (Aug. 1978) pp. 42–43.

*Primary Examiner*—Janice A. Howell
*Attorney, Agent, or Firm*—Fred O. Lewis; Stephen D. Hamel; Michael F. Esposito

[57] ABSTRACT

This invention is a novel portable charger for dosimeters of the electrometer type. The charger does not require batteries or piezoelectric crystals and is of rugged construction. In a preferred embodiment, the charge includes a housing which carries means for mounting a dosimeter to be charged. The housing also includes contact means for impressing a charging voltage across the mounted dosimeter. Also, the housing carries a trigger for operating a charging system mounted in the housing. The charging system includes a magnetic loop including a permanent magnet for establishing a magnetic field through the loop. A segment of the loop is coupled to the trigger for movement thereby to positions opening and closing the loop. A coil inductively coupled with the loop generates coil-generated voltage pulses when the trigger is operated to open and close the loop. The charging system includes an electrical circuit for impressing voltage pulses from the coil across a capacitor for integrating the pulses and applying the resulting integrated voltage across the above-mentioned contact means for charging the dosimeter.

10 Claims, 2 Drawing Figures

PORTABLE BATTERY-FREE CHARGER FOR RADIATION DOSIMETERS

This is a result of a contract with the U.S. Department of Energy.

BACKGROUND OF THE INVENTION

This invention relates generally to devices for electrically charging radiation dosimeters and more particularly to manually operated charge-generators for use with dosimeters of the electrometer-type.

As is well known, electrometer-type dosimeters require charging to selected degree before use and recharging after extended storage or exposure to radiation. There is a continuing need for a manually operated, portable dosimeter charger which is reliable, rugged, and relatively inexpensive. U.S. Pat. No. 4,247,775, which issued to S. Kronenberg on Jan. 27, 1981, discloses a dosimeter charger in which a charging voltage is produced by manually generating a force which is applied to a piezoelectric crystal. Electrometer-type dosimeters and battery-operated chargers therefor are described in various publications, such as the following: Repair and Maintenance Manual for Civil Defense Radiological Instruments, Vol. 4, Office of Civil Defense, Washington, D.C. This manual is incorporated herein by reference.

SUMMARY OF THE INVENTION

Accordingly, it is an object of the invention to provide novel electrical charging apparatus for dosimeters.

It is another object to provide a manually operated, battery-free portable charger for electrometer-type dosimeters.

It is another object to provide a dosimeter charger which is composed throughout of readily available components and which can be stored for long periods without deterioration.

It is another object to provide a relatively inexpensive dosimeter charger designed for one-handed support and operation.

Other objects and advantages will be made evident hereinafter.

In one aspect, the invention is a dosimeter-charging apparatus which includes a housing which carries means for supporting a dosimeter and contact means for impressing a charging voltage across the supported dosimeter. The housing carries a movable element for mechanically operating a charging system. Mounted in the housing is a charging system which incorporates a magnetic loop including a permanent magnet and a segment which is mounted for movement by said element between a loop-open position and a loop-closed position. A coil is inductively coupled with the loop to generate voltage pulses when the movable segment opens and closes the loop. The charging circuit includes an electrical circuit for impressing the inductively generated pulses across the above-mentioned contact means. In a preferred embodiment, the charging circuit includes a first capacitor in series with the coil. The circuit also includes a diode pump comprising first and second diodes, the second diode being connected across the series combination of the coil and first capacitor. The cathode of the second diode is connected to the first capacitor. A second capacitor is connected across the aforementioned pair of contacts and across the pump to integrate pulses generated by the coil. Thus, an impulse voltage equal to the peak-to-peak voltage is impressed across the second capacitor and across the dosimeter.

DETAILED DESCRIPTION OF THE INVENTION

Figure 1:
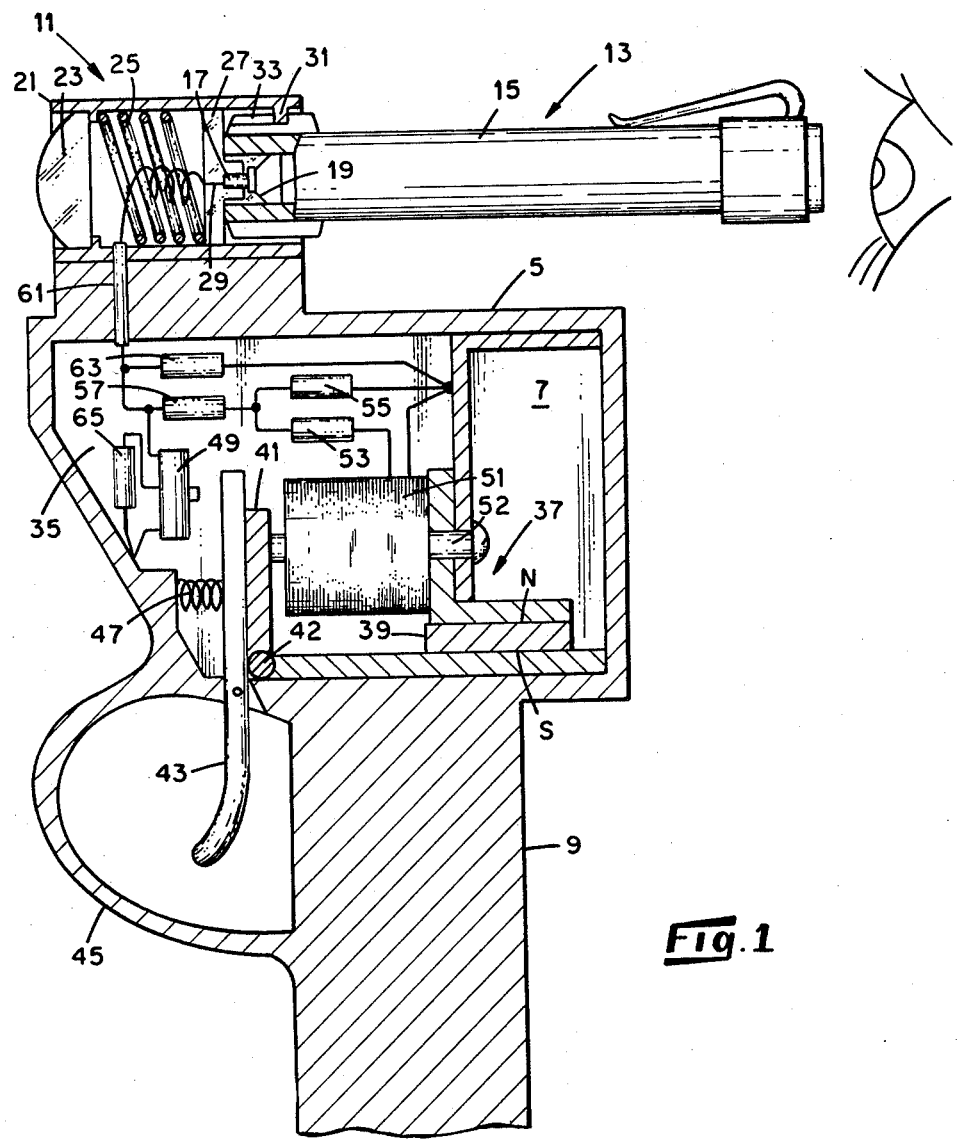
FIG. 1 is a sectional side view of a dosimeter-charger designed in accordance with the invention and an electrometer-type dosimeter mounted for charging by the same.

The embodiment of the invention shown in FIG. 1 includes a metal housing 5 which defines a chamber 7. The housing is provided with a handle 9 and with an external mount 11 for supporting an electrometer-type dosimeter 13 to be charged. The dosimeter shown is of conventional design and includes a barrel 15 fitted at one end with an eyepiece lens (not shown) and at the other with a charging pin 17 extending through a transparent seal 19. The dosimeter may, for example, be Model CD V-730, manufactured by the Bendix Corporation.

The dosimeter mount 11 includes a tubular adaptor 21 having a lens 23 fitted in an end thereof and containing a spring 25 for urging a transparent disc 27 toward the other end of the fitting. As shown, the charging-pin end of the dosimeter inserted is in the adaptor to displace the disc inwardly, the charging pin fitting in a central recess in the disc and making contact with a metal insert 29 extending therethrough. The dosimeter is locked in this position by any suitable means, such as a bayonet fitting comprising lugs (e.g., 31) engaging J-shaped slots (e.g., 33) formed on the end of the dosimeter. With the dosimeter so mounted, there is electrical continuity between the dosimeter barrel 13 and the housing 5 (ground).

Figure 2:
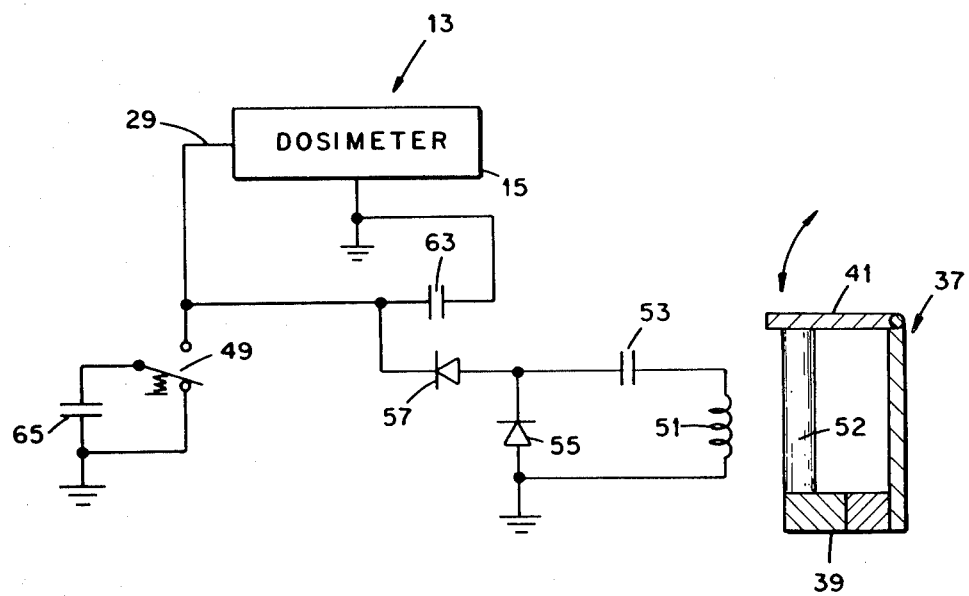
FIG. 2 is an electrical diagram of a charging system incorporated in the charger shown in FIG. 1.

Mounted in the chamber 7 is a charging system 35. As shown in FIGS. 1 and 2, the system comprises a loop 37 of soft iron or other magnetic material, the loop including a permanent magnet 39 for establishing a magnetic flux therein. The loop includes a movable segment 41 for selectively opening and completing the loop. In the illustrated embodiment, the segment is mounted to pivot about a pin 42 and is coupled to a pivoted trigger 43 which extends out of the housing and into a region defined by a trigger guard 45. As shown in FIG. 1, a spring 47 biases the trigger to a position where it maintains the segment in a loop-closed position. Retraction of the trigger pivots the segment to a first loop-open position where the magnetic circuit through the loop is open (incomplete). Further retraction of the trigger moves the segment to a second loop-open position where the trigger contacts the actuating pin of a switch 49, referred to subsequently. As shown, a coil 51 is wound about a leg 52 of the magnetic loop to generate induced voltages when the segment 41 opens loop 37 and closes loop 37.

Referring principally to FIG. 2, a capacitor 53 is connected in series with the coil 51. The resulting combination 51, 53 is connected across a diode 55, the capacitor being connected directly to the cathode of that diode. Diode 55 and a second diode 57 are connected as a diode pump. As shown, the anode of diode 57 is connected to the dosimeter charging pin 17 by a lead which is passed through a tubular insulator 61 extending through the housing wall and is connected to the metal insert 29 (FIG. 1). The aforementioned switch 49 is connected to a capacitor 65 and is spring-biased to a position where it shorts the capacitor to ground. When its actuating pin is depressed, the switch connects capacitor 65 in parallel with capacitor 63.

In a typical operation, the dosimeter to be charged is mounted to the charger as described. When so mounted, the dosimeter is in circuit with the output of the charging system. While viewing the dosimeter scale, the operator pumps the trigger 43 as required to charge the dosimeter and bring the hairline (fiber) to zero position on the scale. That is, the operator repeatedly retracts and moves the trigger between the released position and the first loop-open position. Each time the segment 41 opens the magnetic loop, the magnetic field about the coil collapses, generating a voltage pulse across the coil 51. The voltage pulse charges capacitor 53 and, being blocked by diode 55, is transferred through diode 57 to capacitor 63 and the charging pin of the dosimeter. When the segment 41 re-closes the magnetic loop, a pulse of opposite polarity is induced in the coil; this pulse is blocked by diode 57 but is conducted through diode 55, effectively discharging capacitor 53. Repeated operation of the trigger in this manner incrementally increases the charge on capacitor 63, and the resulting integrated potential (equal to the peak-to-peak generated voltage) is impressed across the dosimeter.

In the event the operator overcharges the dosimeter (i.e., the hairline assumes a position below zero on the scale), he further retracts the trigger to the above-mentioned second loop-open position where the switch 49 is depressed and connects the capacitor 63. By repeatedly actuating the switch 63 with the trigger, the operator alternately transfers charge from capacitor 63 to capacitor 65 and discharges the latter until the hairline is at zero. The dosimeter then is ready for use.

The above-described dosimeter charger meets the need for an efficient, rugged, and reliable charger which is compact and has a long storage life. It may be used by non-technical personnel. The charger is well suited for mass production at comparatively low unit cost. The novel charging system generates the required high voltage with readily available components and avoids the need for piezoelectric crystals. The mechanical parts can be readily fabricated by a machinist or they may be provided in the form of injection-molded plastics and stamped metals.

The foregoing description of a preferred embodiment of the invention has been presented for the purposes of illustration and is not intended to be exhaustive or to limit the invention to the embodiment disclosed. It is intended that the invention be defined by the appended claims.

What is claimed is:

1. Charging apparatus for an electrometer-type dosimeter, comprising:
   (a) a housing,
   (b) means carried by said housing for supporting a dosimeter,
   (c) electrical-contact means carried by said housing and including a pair of contacts for impressing a charging voltage across a dosimeter,
   (d) a charging system in said housing, comprising:
     (1) a magnetic loop including a permanent magnet for establishing magnetic flux therein, said loop including a segment which is hinged for arcuate movement between a loop-closed position and a loop-open position,
     (2) coil means inductively coupled with said loop for generating voltage pulses when said segment is cycled between its loop-closed and loop-open positions,
     (3) electrical circuit means for impressing voltage so generated across said pair of contacts, and
   (e) a trigger carried by said housing, said trigger being operatively coupled to said segment to cycle the same between said positions.

2. The apparatus of claim 1 wherein said electrical circuit includes means for integrating said voltage pulses and applying the resulting integrated voltage across said pair of contacts.

3. The apparatus of claim 1 wherein said coil is bridged by a series combination of a first capacitor and a first diode, the cathode of said diode and a terminal of said capacitor being interconnected to provide a common junction.

4. The apparatus of claim 3 wherein the first diode is sized to discharge the first capacitor when said segment is in the loop-closed position.

5. The apparatus of claim 4 including a second diode whose anode is connected to said junction and whose cathode is connected to one of said contacts.

6. The apparatus of claim 5 including a second capacitor which is connected across said contacts.

7. The apparatus of claim 6 further including switch means and a third capacitor, said switch means normally biased to a first position where it shorts the third capacitor and being movable to a second position where it connects the third capacitor in parallel with the second capacitor.

8. The apparatus of claim 7 wherein said trigger is movable to a position effecting movement of said segment into loop-open position and movement of said switch means into its second position.

9. Charging apparatus for an electrometer-type dosimeter, comprising:
   (a) a housing,
   (b) means carried by said housing for supporting a dosimeter,
   (c) electrical-contact means carried by said housing and including a pair of contacts for impressing a charging voltage across a dosimeter,
   (d) a charging system in said housing, comprising:
     (1) a magnetic loop including a permanent magnet for establishing magnetic flux therein, said loop including a segment which is hinged for arcuate movement between a loop-closed position and a loop-open position,
     (2) coil means inductively coupled with said loop for generating voltage pulses when said segment is cycled between its loop-closed and loop-open positions,
     (3) electrical circuit means for impressing voltage so generated across said pair of contacts,
   (e) a trigger carried by said housing and mounted for movement in the same plane as said segment, said trigger being operatively coupled to said segment to cycle the same between said positions,
   (f) a first capacitor in series with said coil,
   (g) a diode pump comprising a first diode and a second diode, the second diode being connected across the series combination of said coil and capacitor, the cathode of the second diode being connected to said capacitor, and
   (h) a second capacitor connected across said pump to integrate pulses generated by said coil and also connected across said contacts.

10. The apparatus of claim 9 wherein said trigger is spring-biased to a position where said segment is in its loop-closed position.

* * * * *